United States Patent Office 3,436,345
Patented Apr. 1, 1969

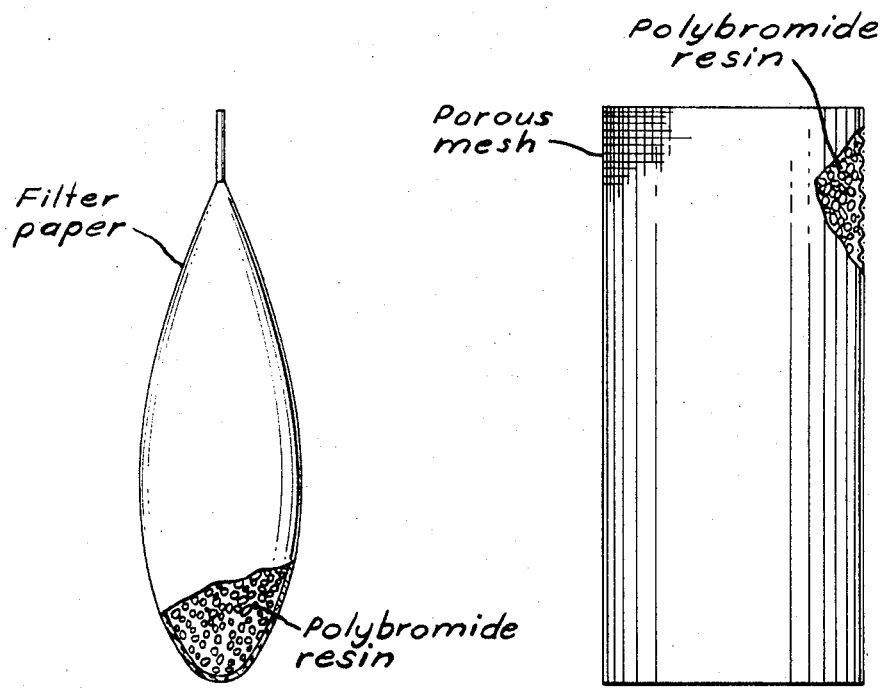

3,436,345
WATER TREATMENT WITH POLYBROMIDE RESIN PACKETS
Robert D. Goodenough, John Place, and Albert A. Gunkler, Midland, Mich., assignors to The Dow Chemical Company, Midland, Mich., a corporation of Delaware
Filed June 22, 1967, Ser. No. 648,052
Int. Cl. C02b 3/08, 1/62
U.S. Cl. 210—62                 8 Claims

ABSTRACT OF THE DISCLOSURE

Water porous packets of a strong base quaternary ammonium anion-exchange resin containing bromine in polybromide form are useful for controlling microorganisms in aqueous solutions.

BACKGROUND

The use of bromine to control microorganisms in water is well known. Henderson suggested disinfection of water with up to about 5 p.p.m. bromine in U.S. Patent 1,995,639. However, handling problems have discouraged its commercial use. In U.S. Patent 3,316,173, Mills, Goodenough and Nekervis treat water with bromine eluted from an anion-exchange resin in polybromide form. The present invention utilizes the Mills E.A. process in a novel form particularly suited for the field treatment of water.

STATEMENT OF INVENTION

It has been discovered that microorganisms in water can be effectively controlled by contact with a strong base quaternary ammonium anion-exchange resin containing in polybromide form sufficient bromine to establish a physiologically acceptable bromine concentration in the treated water. Preferably the resin contains about 0.1–5 weight percent bromine in polybromide form. For example, addition of a packet containing 1 g. of a resin without about 5 weight percent bromine in polybromide form in a water porous bag or cartridge provides an equilibrium bromine concentration of about 1 p.p.m. in a canteen of water 1–2 minutes after addition. Such a 1 g. packet also contains sufficient bromine to treat up to 50 liters of water.

POLYBROMIDE RESIN

Aveston & Everest reported in Chem. & Ind., 1238 (1957) formation of a polybromide resin by absorption of bromine from aqueous solution with an anion-exchange resin. In such a resin the absorbed bromine is held as a complex polybromide anion, e.g., $(Br_{2n} \cdot Br^-)$ where $n$ is 1, 2 or 3.

For the present process, the polybromide form of a commercial strong base quaternary ammonium anion-exchange resin of the type described by McBurney U.S. Patent 2,591,673 or Bauman and McKellar U.S. Patent 2,614,099 is particularly desirable. Weak base anion-exchange resins are less stable in the presence of halogen. The resin particle size is not critical, but a conventional 20–50 mesh resin is particularly suitable.

The strong base anion-exchange resins are readily converted into the requisite polybromide form by slurrying the resin, preferably in bromide form, with sufficient dilute aqueous bromine. Since the equilibrium bromine concentration in the aqueous phase is dependent on the resin bromine content, the weight percent bromine in the polybromide resin is critical. For example, a commercial resin containing about 30% bromine in polybromide form in contact with water at 25° C. gives an aqueous bromine concentration of about 200 p.p.m., much higher than the 0.1–2.0 p.p.m. normally considered physiologically acceptable. The same resin gives an equilibrium concentration of about 1 p.p.m. in water with a bromine content of 5% and about 0.2 p.p.m. with 1%. The bromine equilibrium is influenced to a degree by the resin structure, particularly by the resin crosslinking. However, for a given strong base anion-exchange resin, the equilibrium concentrations are readily determined.

RESIN PACKETS

For treating water as described herein, small packets of polybromide resin in a water-porous bag or cartridge such as shown in FIGURES 1 and 2 are particularly suitable. FIGURE 1 shows a resin packet similar to a tea bag with a porous container of filter paper. A cartridge with a porous mesh wall as shown in FIGURE 2 is another embodiment.

Such packets can be made of a variety of bromine resistant, water-porous materials having sufficient strength to retain the resin particles during use. Suitable materials include high wet strength paper and bleached cotton, loosely woven or mesh forms of polyethylene polypropylene, polyvinyl chloride, polyvinylidene chloride or similar plastics. To prevent loss of bromine by air diffusion, the resin packets should be stored in a sealed container prior to use.

The resin packets can be made in a variety of convenient sizes for use in treating water in canteens, vending machines, mobile home water tanks, or portable military field equipment. They provide a convenient, safe and easily handled means for treating water with bromine.

WATER TREATMENT

In use, the polybromide resin packet is added to the container of water to be treated. Preferably about 1 part of polybromide resin is used per 20–20,000 parts of water. Diffusion of water through the resin within the packet rapidly establishes an equilibrium concentration of bromine in the water. Gentle swirling or agitation within the container facilitates rapid mixing. Unless there is an extremely heavy microbial contamination, effective sterilization of the water occurs within a few minutes and thereafter the equilibrium concentration of bromine remains as protection against recontamination.

The residual bromine content of the treated water can be determined by conventional analysis. However, because of the rapid equilibrium that is achieved between the bromine in the aqueous phase and in the resin, the initial loading of the resin is itself an effective and automatic control of the aqueous bromine concentration.

The following examples further illustrate this invention. Unless otherwise stated, all parts and percentages are by weight.

Example 1.—Treatment of water with polybromide resin packet (A) A strong base quaternary ammonium anion-exchange resin containing 5% bromine in polybromide form was prepared by converting a commercial resin in chloride form (Dowex 21K resin, 20–50 mesh) to the bromide form by ion-exchange with aqueous NaBr. The bromide resin was slurried in water and then 5% bromine based on weight of wet resin was added. The bromine sorption was rapid and essentially quantitative to the point of equilibrium. After thorough mixing the polybromide resin was recovered by filtration. The filtrate contained 1.15 p.p.m. $Br_2$ and had a pH of 2.1. The polybromide resin was reslurried successively with several volumes of distilled water and then with tap water.

(B) A 1–2 g. sample of the resin after washing with tap water was placed in an empty tea bag. Then this resin packet was soaked for 10 minutes in about 500 ml. of distilled water. The pH and bromine content of the water after contact with the polybromide resin was determined at each stage. Typical results are given in Table 1.

TABLE 1.—TREATMENT WITH POLYBROMIDE RESIN (5% $Br_2$)

| Test | Water | pH | P.p.m. $Br_2$ |
|---|---|---|---|
| A-1 | Initial mother liquor | 2.1 | 1.15 |
| A-2 | Distilled wash water | 2.8 | 0.76 |
| A-3 | Tap wash water | 2.95 | 0.83 |
| B-1 | Treated with resin packet | 7.1 | 1.03 |

(C) To test the effectiveness of the 5% polybromide resin in killing bacteria, 1 ml. of a standard *E. coli* dispersion in sterile phosphate buffer containing about $10^8$ bacteria/ml. was added to 199 ml. of water containing about 0.7–1.4 p.p.m. bromine from contact with the 5% polybromide resin. 1 ml. samples of the solution were taken at 0.5, 1, 2, 3, 4, 5 and 10 minutes, and added to 0.5 ml. sterile 2 N sodium thiosulfate to destroy residual bromine. Then 0.1 ml. samples were plated on nutrient agar and incubated at 37° C. and 70% relative humidity for 24 hours before counting. In one experiment at pH 4.3 the number of residual bacteria colonies decreased from more than 200 at 1 minute, to 11 at 2 minutes, to 0 at 3 minutes. In another experiment at pH 6.2 a 99.99% kill of *E. coli* was obtained in less than 60 seconds with a bromine concentration of about 1 p.p.m. from contact with the 5% polybromide resin.

Example 2.—Equilibrium bromine content

To determine equilibrium bromine concentrations in a static system, weighed samples of wet resin in bromide form were placed in stoppered glass flasks. Then sufficient stock aqueous bromine solution (10,000 p.p.m.) was added to provide a bromine loading of from 5–40%. The flasks were shaken for 2 hours, allowed to stand overnight and then reshaken before determining the bromine concentration in the aqueous phase and the weight and settled volume of the polybromide resin. Typical results with several different strong base anion-exchange resins are given in Table 2.

TABLE 2.—EQUILIBRIUM BROMINE CONCENTRATIONS (25° C.)

| Resin [1] | Wt. percent $Br_2$ | P.p.m. $Br_2$ |
|---|---|---|
| Dowex 1-X2 | 28.8 | 615 |
| Dowex 1-X2 | 11.4 | 8 |
| Dowex 1-X8 | 30 | 141 |
| Dowex 1-X16 | 27.5 | 61 |
| Dowex 1-X16 | 11.1 | 6.7 |
| Dowex 11 | 30 | 142 |
| Dowex 21K | 45 | 2,630 |
| Dowex 21K | 33 | 205 |
| Dowex 21K | 11 | 3.5 |
| Dowex 21K | 5 | 1.0 |

[1] Commercial quaternary ammonium styrene-divinylbenzene resin with varying degrees of crosslinking.

Example 3.—Polybromide resin cartridge

A sample of strong base resin containing about 5% bromine in polybromide form was placed in a tube formed of polyvinylidene chloride screening and the ends of the tube sealed. When dropped into a 5 gal. water container, the polybromide resin cartridge was an effective source of bromine for controlling contaminating microorganisms.

We claim:

1. A process for the control of microorganisms in water which comprises contacting the water with a strong base quaternary ammonium anion-exchange resin containing about 0.1–5 weight percent bromine in polybromide form to establish in the treated water an equilibrium bromine concentration of about 0.1–2.0 p.p.m.

2. The process of claim 1 where the polybromide resin is retained in a water-porous packet.

3. A packet suitable for treating water with bromine comprising a water-porous container resistant to dilute aqueous bromine and retained therein a strong base quaternary ammonium anion-exchange resin containing about 0.1–5 weight percent bromine in polybromide form sufficient to establish in the water contacted therewith an equilibrium bromine concentration of about 0.1–2.0 p.p.m.

4. The packet of claim 3 where the container is a bag of high wet strength paper.

5. The packet of claim 3 wherein the container is a water-porous bag of a bleached cotton.

6. The packet of claim 3 where the container is a cartridge with a water-porous screen.

7. The packet of claim 3 where the container is made of a bromine resistant plastic.

8. The packet of claim 7 where the plastic is polyvinylidene chloride.

References Cited

UNITED STATES PATENTS

| 2,985,307 | 5/1961 | Grasmere et al. | 210—169 |
| 3,316,173 | 4/1967 | Mills et al. | 210—62 |

OTHER REFERENCES

Aveston, J., et al.: Chem. and Ind., 1957, pp. 1238 and 1239.

MICHAEL E. ROGERS, *Primary Examiner.*

U.S. Cl. X.R.

206—.5; 210—37; 260—2.1; 424—79